BEST AVAILABLE COPY

D. E. PARIS.

Cooking-Stoves.

No. 5,742. Reissued Jan. 27, 1874.

*Witnesses:*

Amadeus Wiscinson
P. M. De Trust, C.E.

*Inventor:*

Daniel E. Paris
Joseph B. Wilkinson,
assignee of Daniel E. Paris.

AM. PHOTO-LITHOGRAPHIC Co. N.Y.

UNITED STATES PATENT OFFICE.

DANIEL E. PARIS, OF TROY, NEW YORK, ASSIGNOR, BY MESNE ASSIGNMENTS, TO J. B. WILKINSON.

IMPROVEMENT IN COOKING-STOVES.

Specification forming part of Letters Patent No. 67,344, dated July 30, 1867; reissue No. 5,742, dated January 27, 1874; application filed December 18, 1873.

*To all whom it may concern:*

Be it known that DANIEL E. PARIS, of the city of Troy, county of Rensselaer and State of New York, invented a new and useful Improvement in Cooking-Stoves, of which the following is a specification:

The invention which it is sought to protect by these Letters Patent relates to cooking-stoves provided with a reservoir attachment arranged behind the ordinary rear flue-space of the stove. The chief feature of novelty in the invention consists in the use of a damper, as hereinafter set forth, by means of which the action of the products of combustion upon the reservoir, as well as upon the oven, may be largely controlled. The invention further consists in the use of a flanged annular rim around the top of the reservoir.

Figure 1:
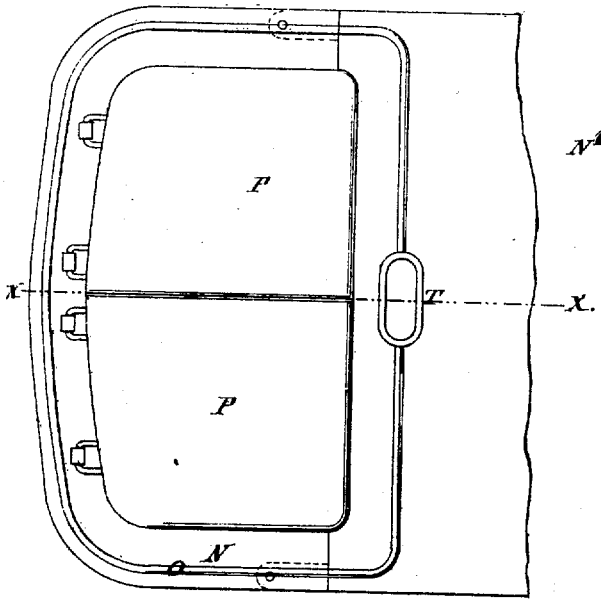
Figure 3:
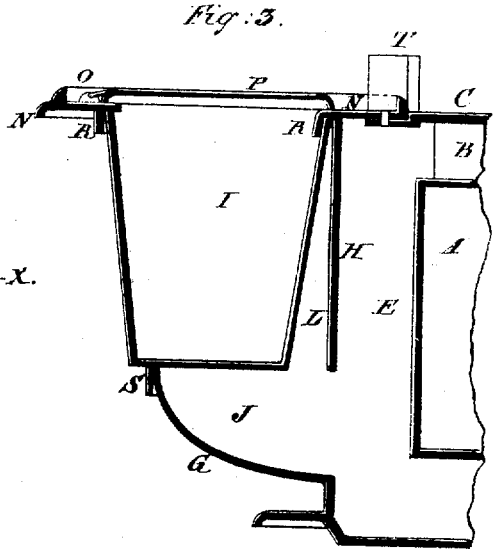
Figure 2:
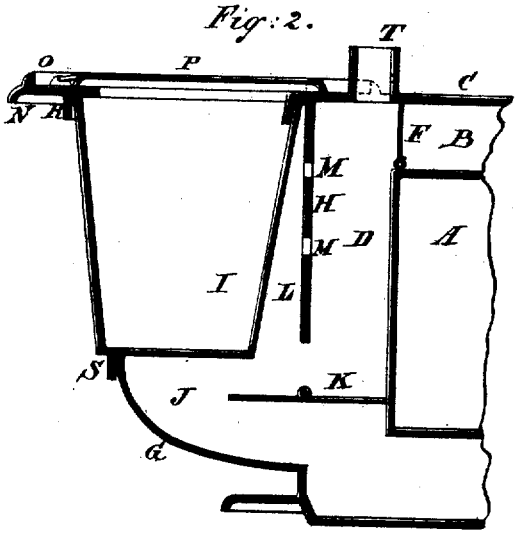
Figure 4:
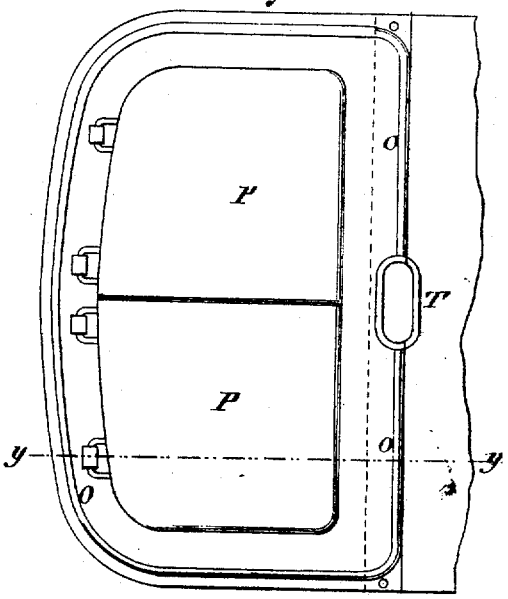

In the drawings, Figures 1 and 4 are top views of the stove, showing in plan the flanged cap or rim that covers the top edge of the reservoir. Fig. 2 is a vertical longitudinal section of the rear part of a diving-flue stove and its reservoir attachment, the section being through the ascending flue on the line *x x* of Fig. 1. Fig. 3 is a vertical longitudinal section of the same stove on the line *y y* of Fig. 4, where an opening is made through the back plate of the stove opposite the descending flue.

The various parts are represented in the drawings, as follows: A is the oven. B is the top flue above the oven. C is the top plate of the stove. D is the ordinary rear central flue. E is a side descending flue. F is the damper ordinarily found in diving-flue stoves, which, when open, allows the heat to pass directly into the exit-pipe, and, when closed, compels it to pass down the side flue or flues. G is a curved plate projecting outwardly from the lower part of the back plate of the stove, and performing the twofold office of sustaining or supporting the tank I, and forming the lower part, J, of the reservoir-chamber J L, which extends underneath and up the front side of the reservoir or tank. H is the back plate of the stove, having an aperture in it leading from the ascending-flue space to the reservoir-chamber. K is a damper, which, when turned up vertically, closes this aperture through the back plate. L is a hot-air space between the front wall of the reservoir and the back plate of the stove, constituting the upper part of the reservoir-chamber. M M are apertures in the upper part of the back plate, opening into the flue-space, designed to produce an active circulation of hot air along the face of the reservoir, between it and the back plate H. N is a cap or rim to the reservoir, resting upon its top edge, and passing around both the back and the two ends; or, preferably, it may be made annular, as shown in Figs. 3 and 4, covering the upper edge not only of the back and the ends of the reservoir, but also of the front thereof, and also a part or the whole of the rear flue-space of the stove. P P are covers hung directly to the cap or rim N. O is a ridge or upwardly-projecting flange, formed on the upper surface of the cap or rim N, at or near its outer edge, to prevent the water that may be spilled on the top from running off on the floor, and for conducting it back into the tank. R is a flange formed on the under side of the rim or cap N, to fit the upper part of the tank. S is a flange cast upon the bottom of the tank, and of such form as to fit the seat G; and T is the exit-pipe.

The rim N, when made in annular form, may be attached directly to the top plate of the stove, as shown in Figs. 3 and 4. When made as shown in Figs. 1 and 2 it can be attached to lugs formed upon the rear of the stove for the purpose.

The curved plate G forms an open seat for the reservoir, which rests upon the edge of the walls of such seat. This construction permits the products of combustion to strike against the bottom of the reservoir throughout a wider extent than if the reservoir were supported on a plate inclosing the top of the hot-air chamber J, the central part only of such plate being cut away to expose the reservoir to the action of the heated currents.

The operation of the stove, when constructed as shown in Figs. 2 and 3, is as follows: When the damper F is open, a direct draft is created, and the products of combustion pass at once to the exit-pipe. When the two dampers F and K are closed, the currents are down the side flue, under the oven, and back to the ascending flue, whence they reach the exit-pipe. In this case there will be no active circulation of the products of combustion through any part of the reservoir-chamber. Although the hot air will expand into this chamber through the open aperture communicating between it and the side flue, the effect will be materially different from that produced by passing the products of combustion in active currents through the chamber. By opening the damper K, while the damper F remains closed, the currents will be down the side flue to the opening leading into the reservoir-chamber, thence through this chamber in direct contact with the external walls of the reservoir, and thence to an ascending flue, thus reaching the exit-pipe without having heated the bottom of the oven at all.

By this arrangement of dampers in diving-flue stoves it becomes possible, without changing the exit-pipe from its ordinary location over the ascending flue, to throw the full force of the hot-air currents upon the reservoir, without having previously deprived them of their caloric by passing them under the oven. As a result of this the reservoir, whenever desired, may be more quickly and more highly heated than would be possible if the products of combustion were first compelled to traverse the flue-spaces under the oven.

The course that is thus traversed by the hot-air currents as they pass down the descending flue into the reservoir-chamber, and thence through the ascending flue to the exit-pipe, has come to be denominated a "downward and upward draft-flue;" and it is believed that this is the first instance in which such a flue is found in a diving-flue reservoir-stove, in connection with an exit-pipe placed over, or communicating directly with, the ordinary rear flue-space. It is the presence of this feature in the stove that specially distinguishes it from those in which the products of combustion, in order to heat the reservoir, must also pass under the oven.

The damper K, as shown in Fig. 2, is made to rotate on an axis, and is of such dimensions that, when turned down into a horizontal position, it entirely fills the space between the back plate of the stove and the back plate of the oven.

This construction of damper is specially adapted to stoves in which the products of combustion are made to pass under the oven before ascending in rear thereof to the exit-pipe—as, for instance, where the entire space in rear of the oven is occupied by the ascending flue, or where the back plate of an ordinary diving-flue stove is preserved entire between the reservoir-chamber and the side flue, instead of being cut away, as shown in Fig. 3. In such cases not only will the products of combustion, when the damper is open, be driven from the ascending flue into the reservoir-chamber, (in which respect its operation will resemble that of the sliding damper shown in the stove patented to Samuel B. Spaulding, June 22, 1858,) but when the damper is closed it will entirely exclude the products of combustion from the reservoir-chamber, thus performing its work more completely and effectually than the sliding damper of the Spaulding stove. The chief advantage arising from this is, that it will prevent the unnecessary evaporation of water. As it is often required to heat the stove and to use the oven when there is no occasion for heating the contents of the tank, it is unnecessary and undesirable at such times to admit the heated air to the chamber in which the tank is situated.

By locating the water-reservoir behind the oven, as shown, the entire top of the stove, as ordinarily constructed, will be available, as heretofore, for the various culinary operations; secondly, the reservoir can be made of a different metal from what would be required if the flames passed directly from the fire-box into contact with the walls of the reservoir; and, thirdly, this position makes it possible to heat the reservoir, as hereinbefore described, without passing the products of combustion under the oven. This last result, moreover, is attained without changing the exit-pipe from the position it ordinarily occupies. The exit-pipe connects directly with the flue-space behind the oven, the reservoir, in turn, being behind the pipe-collar. By this arrangement, when the damper between the flue-space and the reservoir-chamber is closed, the products of combustion will escape without being brought in their ascent into contact with the reservoir.

What is claimed as new is—

1. The cap or rim surmounting the reservoir, and provided with a flange or bead that serves as a water-guard, substantially as shown and described.

2. The combination of the following elements: First, a reservoir-chamber located behind the ordinary rear flue-space of a diving-flue stove; second, apertures communicating between this chamber and the ascending and descending portion, respectively, of such flue-space; third, a damper controlling the passage of hot-air currents through such apertures, substantially as described.

3. In combination with the exit-pipe, connecting directly with the ordinary rear flue-space of a diving-flue cook-stove, a downward and upward draft-flue, by means of which the products of combustion may be brought in contact with a water-reservoir located behind such flue-space without passing under the oven.

4. The combination of the following elements: First, a hot-air chamber contiguous to and embracing some portion of a water-reservoir located exterior to the walls that inclose the ordinary rear flue-space of a cook-stove; second, an opening or aperture communicating between such chamber and such flue-space, and provided with a damper for opening or closing it at pleasure; third, an exit-pipe communicating directly with the ordinary rear flue-space of the stove.

5. In combination with the ascending flue of a cook-stove, a revolving damper, by means of which the products of combustion may be forced into the reservoir-chamber or excluded therefrom at pleasure.

JOSEPH B. WILKINSON,
*Assignee.*

Witnesses:
ALMADAS WILKINSON,
EDMUND T. COLE.